United States Patent [19]

Ladusaw

[11] 4,240,774
[45] Dec. 23, 1980

[54] HERMETICALLY SEALED COMPRESSOR SUCTION TUBE AND METHOD OF ASSEMBLY

[75] Inventor: William T. Ladusaw, Jeffersontown, Ky.

[73] Assignee: General Electric Company, Louisville, Ky.

[21] Appl. No.: 12,280

[22] Filed: Feb. 15, 1979

[51] Int. Cl.³ .................... F04C 29/00; F16L 13/14; B21D 39/04
[52] U.S. Cl. .................................... 418/248; 417/902; 285/382.4; 29/520; 29/523
[58] Field of Search .............. 418/248, 270; 417/902; 285/382.4, 382.5; 29/507, 508, 520, 523

[56] References Cited

U.S. PATENT DOCUMENTS

| Re. 25,653 | 10/1964 | Longfellow | 285/382.4 |
|---|---|---|---|
| 1,647,447 | 11/1927 | Hartnett | 29/523 |
| 1,961,453 | 6/1934 | Quarnstrom | 29/520 |
| 3,767,334 | 10/1973 | Rinehart | 418/248 |
| 3,833,984 | 9/1974 | Dietzel | 29/523 |
| 3,870,440 | 3/1975 | Zuercher, Jr. | 418/248 |
| 3,871,800 | 3/1975 | Slayton | 418/248 |
| 4,061,367 | 12/1977 | Moebius | 29/520 |

FOREIGN PATENT DOCUMENTS 367419  2/1932  United Kingdom ............ 29/523

Primary Examiner—John J. Vrablik
Attorney, Agent, or Firm—Frank P. Giacalone; Radford M. Reams

[57] ABSTRACT

A hermetic compressor unit comprising a hermetic casing containing a compressor including a cylinder block having an arcuate surface engaging the inner surface of the casing and a suction tube assembly for connecting the compressor to a refrigeration system. The suction tube assembly comprises a connector including an end portion extending into an opening in the casing in alignment with a suction passage in the cylinder block. A tubular sleeve member chosen from the group of metals having a higher ductility than steel has a first portion arranged in the suction passage and a second compressible portion arranged in the connector. A steel tubular fitting includes a first portion press fit into the first portion of the sleeve member and a second portion dimensioned to engage and collapse the compressible second portion of the steel fitting to simultaneously effect a fluid tight seal in the suction passage and connector thereby sealing the compressor casing and suction tube assembly to the compressor.

8 Claims, 4 Drawing Figures

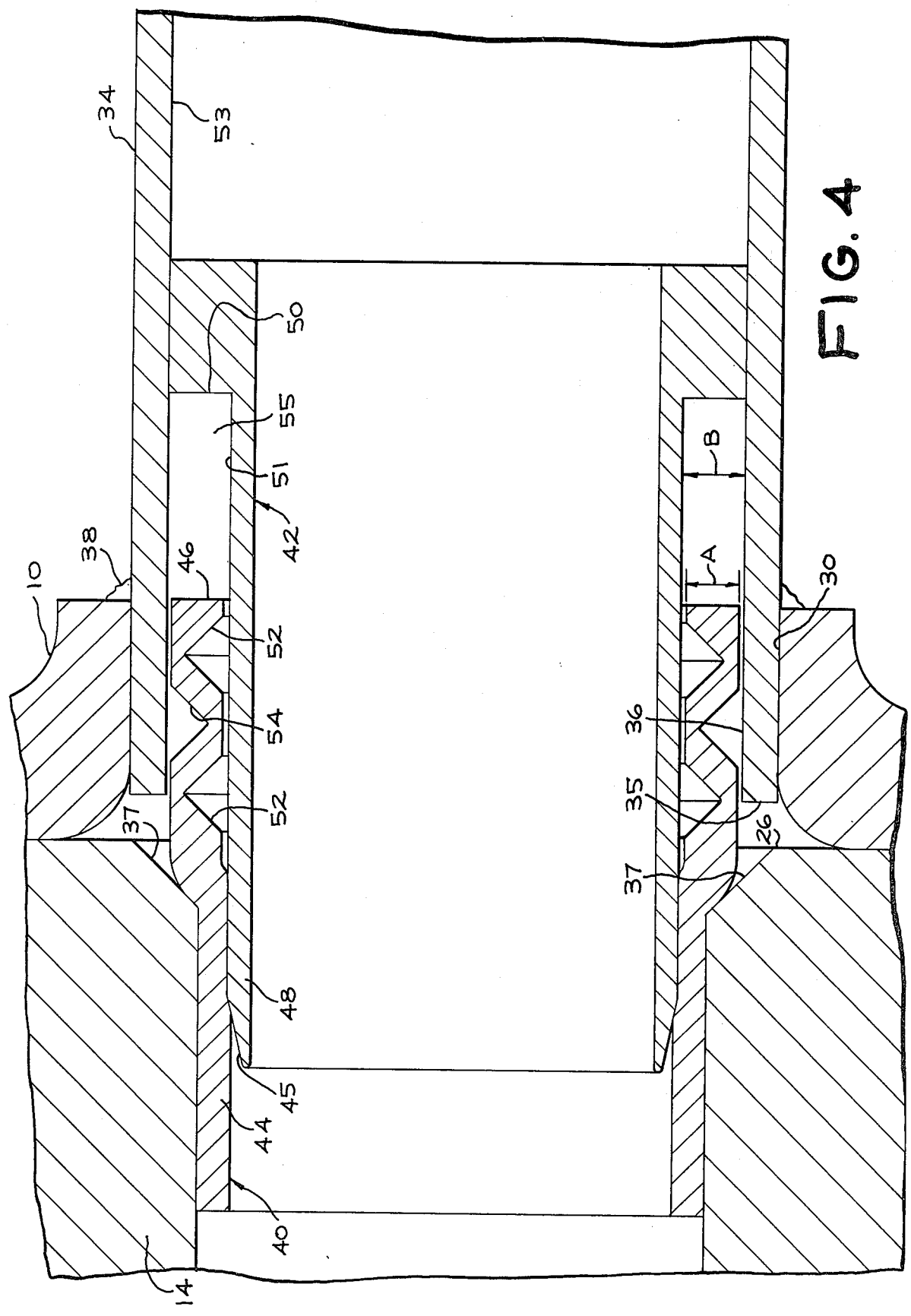

HERMETICALLY SEALED COMPRESSOR SUCTION TUBE AND METHOD OF ASSEMBLY

BACKGROUND OF THE INVENTION

In the manufacture of hermetic compressors for use in refrigeration systems, it is necessary to provide a fluid tight connector means for connecting the hermetic compressor unit within a casing to the refrigeration system.

Generally, the connecting tube between the compressor and the refrigeration system may be copper, aluminum or steel and is generally brazed or welded to the casing suction opening. A fluid tight connection must be made between the compressor cylinder passage and the connecting tube. Prior art systems for providing fluid tight connection between the compressor cylinder suction passage and the connecting tube to the refrigeration system are shown in U.S. Pat. Nos. 3,767,334–Rinehart; 3,870,440–Zuercher, Jr., and 3,871,800–Slayton, all being assigned to General Electric Company, assignee of the present invention. The Rinehart patent shows a suction tube assembly employing an aluminum conduit joined to the steel casing and a steel tubular fitting including an end portion press fit into the compressor, and a shoulder portion engaging the aluminum conduit. The Zuercher, Jr. patent shows a suction tube assembly employing a steel connector joined to the steel casing and a steel tubular fitting including one end portion press fit into the compressor and a shoulder portion that engages and compresses a ductile ring between the shoulder and the steel connector. The Slayton patent shows a suction tube assembly employing a steel connector joined to the steel casing and a sleeve of ductile material arranged to have a portion in the compressor and a portion in the connector. A steel sleeve including one end portion press fit into the sleeve of ductile material in the compressor and a second portion engaging and compressing the ductile sleeve portion in the connector.

SUMMARY

The present invention is particularly directed to an improved hermetic compressor unit assembly and the method of assuring a fluid tight connection between the compressor cylinder and the suction tube assembly in a manner that provides an effective seal between the case pressure and the suction passage to the cylinder. In accordance with the illustrated embodiment of the invention, there is provided a hermetic compressor unit comprising a casing and a compressor including a cylinder or compressor block which may be press fit welded or heat shrunk into contact with the casing side wall. The block includes a suction passage opening and the casing is provided with a hole aligned with and larger than the suction passage. A tubular connector is secured to the casing so that an end portion extends into the casing hole to a point adjacent the suction passage opening in the block. A tubular sleeve member being of greater ductibility than the cylinder block has a first portion arranged in the passage and an enlarged axial compressible second portion arranged in the connector. The enlarged compressible end includes a series of folds or pleats. A tubular steel fitting has a portion press fit into the first portion of the tubular sleeve and a flange portion dimensioned to engage the compressible end. The folds produce a bellows-like collapsing movement thereof upon axial compression by the flange that causes an increase in the lateral dimension of the compressible end to provide a seal between the connector and passage.

BRIEF DESCRIPTION OF THE DRAWINGS

FIG. 4 is a further enlargement similar to FIGS. 2 and 3 showing the parts in still another position during assembly of the connection.

DESCRIPTION OF THE PREFERRED EMBODIMENT

Figure 1:
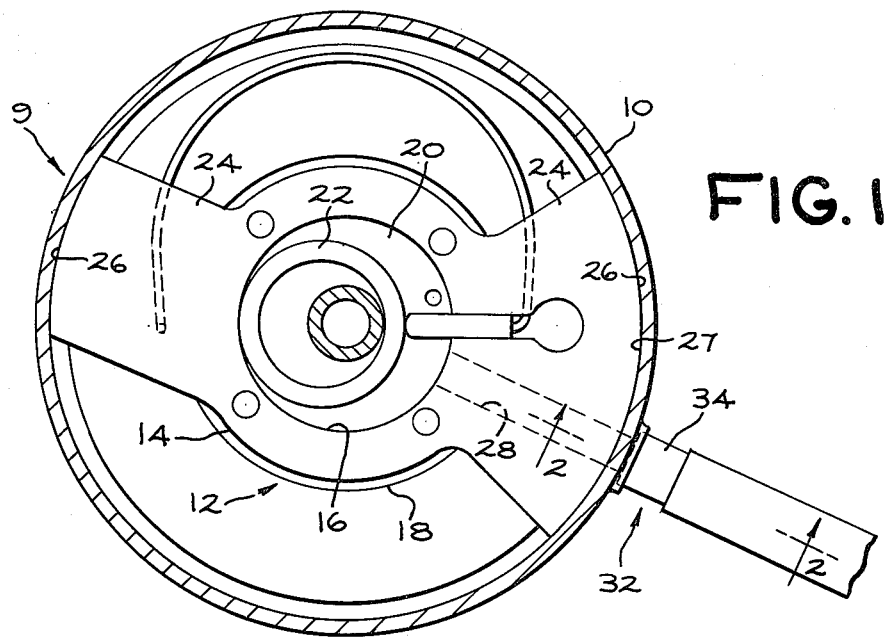
FIG. 1 is a horizontal sectional view of a refrigerant compressor unit incorporating the present invention.

With reference to FIG. 1 of the drawings, there is illustrated a hermetic rotary compressor unit 9 comprising a cylindrical casing 10 in which there is disposed a rotary compressor 12. The compressor 12 includes a cylinder block 14 having an inner cylindrical surface 16 which, in combination with an end plate 18 and a second end plate (not shown), defines a compressor cylinder 20 containing a rotor 22.

The cylinder block 14 includes diametrically opposed legs or extensions 24 having arcuate surfaces 26 engaging the inner surface 27 of the cylindrical casing wall 10. In the manufacture of such compressors, the cylinder block may be pressed into the casing 10 or the casing 10 heat shrunk onto the surface 26 of cylinder block 14.

Figure 3:
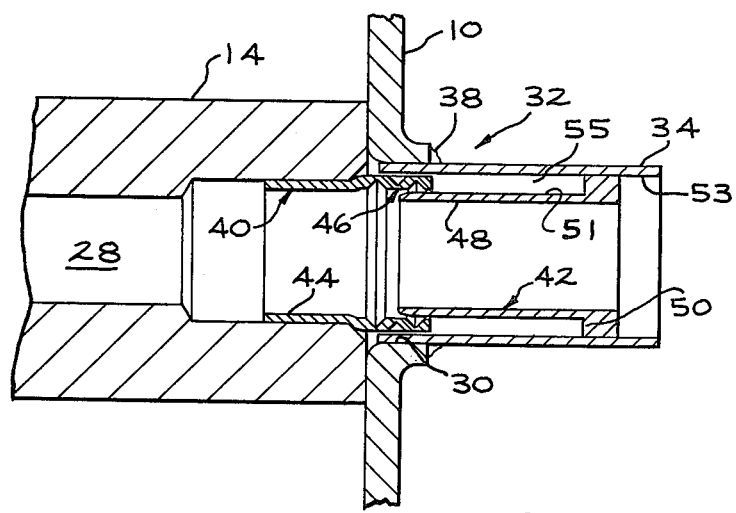
FIG. 3 is an enlarged section similar to FIG. 2 showing the parts in a different position during assembly of the connection.
Figure 2:
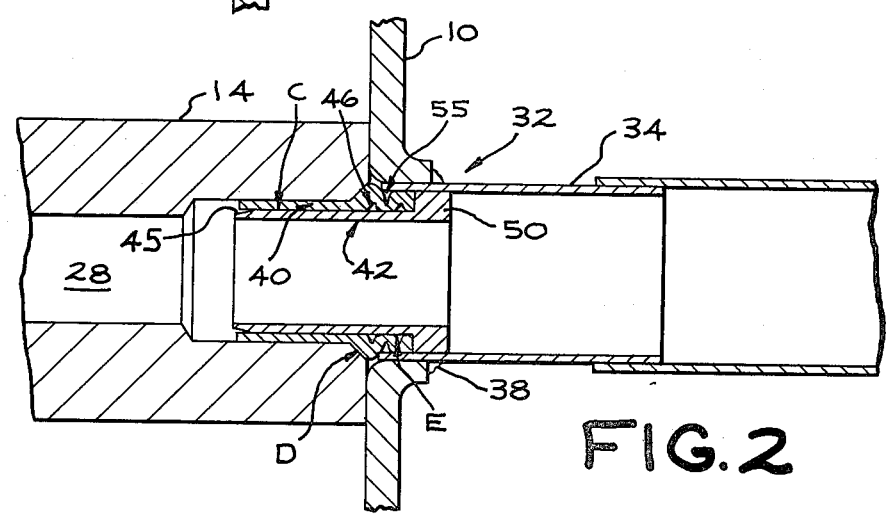
FIG. 2 is an enlarged section view taken along lines 2—2 of FIG. 1.

A suction passage 28 extends through the cylinder block 14 from one of the arcuate surfaces 26 in the area of leg 24 as shown and into the compressor cylinder 20. The outer end of this passage 28 in surface 26, as shown in FIGS. 2 and 3 of the drawing, is in axial alignment with a flanged hole 30 in the casing side wall 10. The hole 30 has a somewhat larger diameter than passage 28. A compressor of this general construction is shown in U.S. Pat. No. 3,568,712–Rinehart, to which reference is made for a more detailed description of its construction and operation. Generally the relatively low pressure suction gas is introduced into the cylinder 20 where it is compressed, the compressed high pressure gas is then discharged into the case 10 and exists through an appropriate discharge line (not shown) and into the refrigerant system as disclosed in the above-mentioned Rinehart patent.

In accordance with the present invention means are provided for connecting the suction line of a refrigeration system (not shown) to the suction passage 28 in a manner that provides an effective seal between the relative high pressure case and the suction passage. To this end in the embodiment of the invention, as shown in FIG. 2, there is provided a suction tube assembly 32. The assembly includes a tubular suction tube or connector 34 whose inner diameter is larger than that of passage 28. While in the present embodiment shown the connector 34 is copper it should be noted that in some instances steel connectors may be employed as disclosed in the Slayton patent. The connector 34 has one end portion 36 extending into or through the hole 30 so that the distal edge of open end 35 is adjacent the opening 37 of passage 28 in arcuate surface 26 of the compressor block 14. The end portion 36 preferably has an outer diameter slightly smaller than the hole 30 to provide clearance for brazing or soldering of the end portion 36 to the casing 10, as indicated at 38 to form a fluid tight seal between the casing 10 and the connector 34.

Means are provided in the present invention to mechanically secure the connector 34 to the compressor suction passage 28 in a fluid tight arrangement. The means include a tubular sleeve member 40 chosen from the group of metals having a higher ductility than steel, and a steel tubular fitting member 42. While in the present embodiment aluminum is used to fabricate member 40, it should be understood that other ductile materials relative to the steel block 14 and sleeve 42 may be employed.

Referring now to FIGS. 2-4, the aluminum member 40 has a reduced end portion 44 which extends into the cylinder suction passage 28 and an enlarged compressible portion 46 extending radially outwardly into the larger end portion 36 of the connector 34 generally in the area defined by the opening 30. As will now be explained, tubular steel fitting 42 is employed to mechanically connect in a fluid tight relationship the connector 34 to the passage 28 through the relative ductile member 40. Fitting 42 has a reduced or smaller end portion 48 whose outside diameter is dimensioned slightly larger than the inner diameter of portion 44 of sleeve 40. The outer surface area 51 of fitting 42 at its distal end is provided with a taper 45 which facilitates the insertion of member 42 into portion 44 of member 40 during the fabrication of the assembly 32. The other end of fitting 42 includes an enlarged shoulder portion 50 that extends radially outwardly from the outer wall surface 51 to a position over portion 46 with its outer circumferentially disposed wall being juxtapositioned relative to the inner wall surface 53 of connector 34. This arrangement provides a circumferentially disposed area 55 defined by the inner wall 53 of connector 34 and the outer wall 51 of member 42. The radial or lateral dimension of area 55 which is designated B is greater than the thickness designated A of collapsible portion 46 as shown in its normally or radially extended position as viewed in FIGS. 3 and 4. Referring now to FIG. 4 it will be seen that the radial or lateral dimension A of portion 46 relative to the central axis of assembly 32 is such that axial clearance exists between the portion 46 and wall portions 53 and 51 of connector 34 and fitting 42 respectively.

In accordance with the present invention a seal between connector 34 and passage 28 is provided in three different points of the assembly 32. As seen in FIG. 2 one area of seal designated C is between the portion 48 of fitting 42 and the passage 28 when as will be explained later the portion 44 of the ductile member 40 is deformed therebetween. Another area of seal designated D is between the opening 37 of suction passage 28 in the surface 26 and the open end portion 35 of connector 34, and, the other area of seal designated E is between the outer wall 51 of member 42 and the inner wall 53 of connector 34.

The seal between the walls 51 and 53 in the seal area E is effected at a plurality of points along the cooperating wall sections in area 55. To provide this sealing arrangement the end portion 46 is designed to be radially collapsed under compression by action of the shoulder 50 as the member 42 is driven axially into the assembly 32. This axial compressibility of the portion 46 is provided by a series of peripheral convoluted folds or pleats such as to produce a bellows-like collapsing movement thereof upon axial compression. In the embodiment shown the folds are produced by plurality of grooves 52, 54 spaced axially and formed alternatively in the inner and outer walls of portion 46, however compressibility and the effective bellows-like collapsing of portion 46 can be accomplished with other accordion-like configurations. The seals at a plurality of points in area 55 are effected when during the compression of portion 46 its lateral dimension A or more specifically the lateral dimension defined by the inner and outer apex or distal ends of the folds increase and compress against the walls 51 and 53 respectively. The seals being provided at each contact between the apex portion of the folds and its cooperating wall. The member 40 may be fabricated from a material that while softer than the steel member 42 is harder than the connector 34 when as mentioned above is copper. In this instance portion 36 of connector 34 which is backed by the casing in 10 the hole area 30 will be deformed by the laterally extending folds as they are compressed. The grooves caused by the compressed folds enhance the seal between the connector 34 and sleeve 42.

The method of assembling the present suction tube arrangement include, initially securing the end portion 36 of connector 34 in the hole 30 of casing 10. The aluminum or ductile sleeve member 40 is then arranged as shown in FIG. 3 with portion 44 in passageway 28 and the enlarged compressible portion 46 positioned with one axial end in engagement with opening 37 and extending into the end portion 36 of connector 34. Steel sleeve 42 is then driven axially into connector 34 so that its smaller end 48 which includes tapered portion 45 engages and compresses the reduced portion of sleeve 40. As mentioned above, the outer diameter of portion 48 is larger than the inner diameter of portion 44 and, accordingly, the more ductile aluminum member is compressed and deformed as the portion 48 of the steel fitting 42 is driven into the portion 44 of sleeve 40 to effect a fluid tight seal in passage 28. The position of fitting 42 in sleeve 40 as seen in FIG. 4 shows the portion 44 partly compressed, or in the process of being fully compressed.

As the tubular fitting 42 continues its axial movement into the sleeve 40, flange 50 engages the portion 46 and axially compresses it in area 55 between the opening 37 and flange 50. The bellows-like convoluted folds collapse and are compressed to engage alternatively the inner and outer walls 53 and 51 respectively of connector 34 and fitting 42. This axial compressibility of portion 46 causes a plurality of seal points in area 55 as the folds expand laterally relative to the central axis of the assembly 32 the continued compression of portion 46 forces a portion thereof to effect the seal between the end 35 and surface 26.

In summary the tubular steel fitting 42 simultaneously compresses the aluminum sleeve 40 to provide an effective fluid tight seal between passage 28 and connector 34 in three areas or critical points; namely, area C in passage 28, area D between the end portion 35 of connector 34 and opening 37 in the block 14, and area E between the connector 34 and member 42. The seal in area E is in effect a multi-point seal between the radial or apex ends of the collapsed folds as they are compressed against the walls 51 and 53. It should be understood that the number of folds and points of seal relative to walls 51 and 53 may vary to meet design requirements such as dimension and case gas pressure.

It should be apparent to those skilled in the art that the embodiment described heretofore is considered to be presently preferred form of this invention. In accordance with the Patent Statutes, changes may be made in the disclosed apparatus and the manner in which it is used without actually departing from the true spirit and scope of this invention.

I claim:

1. A hermetic compressor unit comprising:
   a casing including a side wall;
   a compressor including a cylinder block positioned in said casing and having an outer surface adjacent the inner surface of said casing wall;
   a suction passage in said block opening into said outer surface;
   said casing having an opening aligned with and larger than said passage;
   a suction tube having an inner diameter larger than said passage including one end portion positioned in said casing opening;
   a tubular sleeve member being of greater ductility than said cylinder block includes a first portion arranged in said passage and an enlarged axially compressible portion arranged in said one end portion of said suction tube;
   a tubular fitting having an end portion extending into said first portion of said tubular sleeve member with a larger diameter than the inside diameter of the first portion of the tubular sleeve and a shoulder portion extending radially outwardly to a position adjacent the inner wall of said suction tube to provide a circumferentially disposed area extending axially between said shoulder and said suction passage opening, said shoulder being in axial alignment with said compressible portion whereby axial movement of said fitting simultaneously radially compresses said first portion of said tubular sleeve in said passage to form a first seal area, and axially compresses said compressible portion in said circumferentially disposed area to form a second sealing area between said shoulder and said suction passage opening, and a third sealing area between said suction tube and said tubular fitting to seal the casing and suction tube connector to the compressor cylinder block.

2. The hermetic compressor unit of claim 1 wherein said compressible portion of said tubular sleeve member is formed with at least one fold thereof extending about its periphery whereby said axial compression is produced by compression of said at least one fold.

3. The hermetic compressor unit of claim 2 wherein said at least one fold is formed with a plurality of grooves spaced axially and arranged alternatively in the inner and outer walls of said compressible portion.

4. The hermetic compressor unit of claim 3 wherein said one end of said suction tube portion in said casing opening has its circumferentially disposed edge positioned adjacent said passage opening.

5. The hermetic compressor unit of claim 4 wherein said compressible portion extends radially outwardly from said first portion to form a shoulder portion positioned circumferentially about said opening on said outer surface of said block.

6. The hermetic compressor unit of claim 5 wherein a portion of said compressible end portion moved into engagement between said circumferentially disposed edge and said passage opening to form a seal therebetween.

7. The method of connecting a suction tube assembly to a hermetic compressor unit, including a casing having a side wall; a compressor including a cylinder block positioned in said casing and having an outer surface adjacent the inner surface of said casing wall; a suction passage in said block opening into said outer surface; said casing having an opening aligned with and larger than said passage; a suction tube having an end portion positioned in said casing opening having an inner diameter larger than said passage; a tubular sleeve member being of greater ductility than said cylinder block including a first portion dimensioned to be arranged in said passage and an enlarged axially compressible portion dimensioned to be arranged in said suction tube; said enlarged portion including a series of wave-like undulations; a tubular fitting having an end portion having a diameter larger than said reduced end portion of said sleeve member, and a shoulder portion projecting radially outwardly over said enlarged portion to a position adjacent the inner wall of said suction tube to provide a circumferentially disposed area extending axially between said shoulder and said suction passage opening comprising the steps of:
   inserting said sleeve member axially in said suction tube so that its first portion is positioned in said passage and said enlarged compressible portion is arranged in said suction tube;
   inserting said fitting axially so that said reduced end portion engages and compresses said first portion of said tubular portion between said passage wall and said reduced end portion to provide a seal between said passage and said fitting; and
   continuing the insertion of said fitting so that said shoulder portion engages said enlarged compressible portion of said tubular sleeve member until said compressible portion collapses in said circumferentially disposed area to form a seal between said passage and said suction tube, whereby said axial movement if said fitting simultaneously radially compresses said first portion of said tubular sleeve and axially compresses said compressible portion to fluid tight seal the casing and suction tube to the compressor cylinder block.

8. The method as set forth in claim 7 wherein said compressible enlarged portion of said tubular sleeve is formed with at least one fold thereof extending about its periphery whereby said axial compressor is produced by compression of said at least one fold during the continuing step of inserting said fitting.

* * * * *